Sept. 22, 1942. H. C. OTIS Re. 22,180

WELL DEVICE

Original Filed Sept. 27, 1937

Inventor
Herbert C. Otis.

By

Attorney

Reissued Sept. 22, 1942

Re. 22,180

UNITED STATES PATENT OFFICE 22,180

WELL DEVICE

Herbert C. Otis, Dallas, Tex.

Original No. 2,196,535, dated April 9, 1940, Serial No. 165,848, September 27, 1937. Application for reissue April 4, 1941, Serial No. 386,951

24 Claims. (Cl. 166—2)

This invention relates to new and useful improvements in well devices.

One object of the invention is to provide an improved device arranged to be lowered into the well tubing and having means for automatically shutting off the flow through the tubing when the velocity of the flow exceeds a predetermined rate.

An important object of the invention is to provide an improved device which may be positioned at any point within a well tubing and having means, which may be automatic, for shutting off the flow through said tubing; said means being exposed to the well fluid and being arranged to be actuated when the forces created by the well fluid acting against said means are sufficiently unbalanced to cause movement thereof.

Another object of the invention is to provide an improved device of the character described wherein the well fluid flows through a flow passage provided in said device, with a movable valve for controlling the flow through said passage; said valve being so arranged that as long as the velocity of flow of the fluid through the passage is at a normal or predetermined rate the valve remains in an open or inactive position and is arranged to close when the velocity of flow is increased above such normal or predetermined rate.

Still another object of the invention is to provide an improved device having a movable valve element exposed to the well fluid, and means for restricting the flow of well fluid through the device so that a pressure differential is set up across the element; the element being so constructed that it is actuated by a predetermined pressure differential to shut off flow through the device.

A further object of the invention is to provide a well device of the character described including a valve so arranged that it may be moved from a closed position, to resume flowing, by equalizing the pressures across the valve or by overcoming the pressure acting upwardly to close said valve, effected by means of a suitable tool lowered from the surface or by by-passing the fluid around said valve; all of which may be accomplished without disturbing the position of the device or removing it from the well.

Still another object of the invention is to provide an improved device of the character described which may be run into and removed from the well tubing on a wire line or cable and which may be readily positioned at any point within the tubing or removed therefrom without removing the tubing.

A construction designed to carry out the invention will be hereinafter described, together with other features of the invention.

Figure 1:
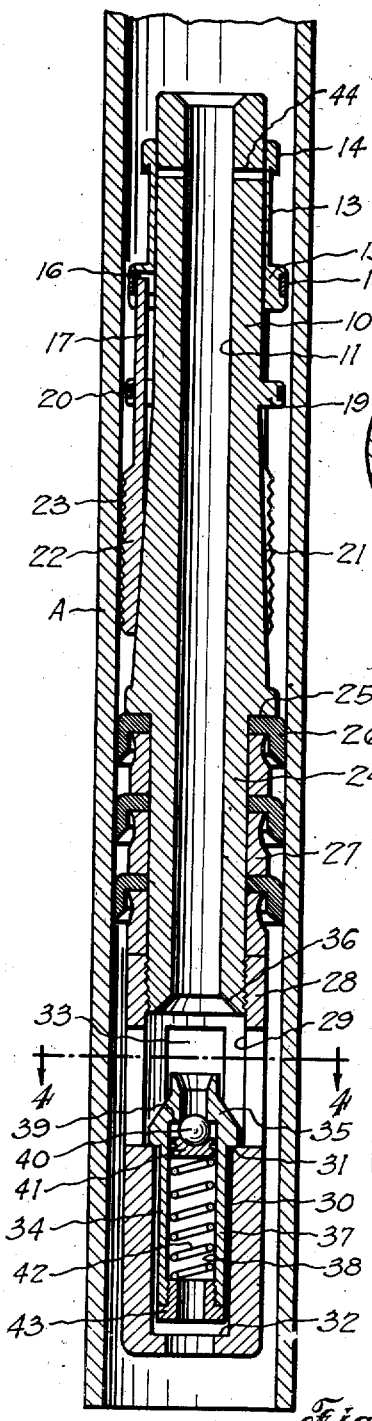
Figure 4:
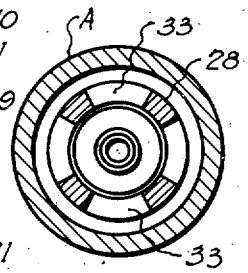
Figure 2:
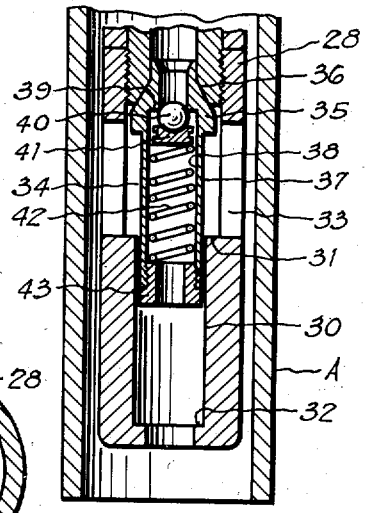
Figure 3:
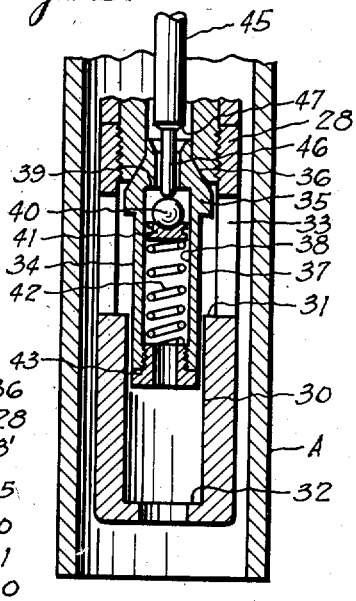
Figure 5:
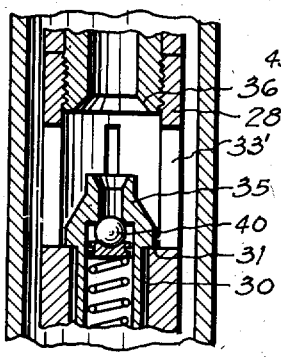

The invention will be more readily understood from a reading of the following specification and by reference to the accompanying drawing, in which an example of the invention is shown, and wherein:

Figure 1 is a transverse, vertical, sectional view of a well device, constructed in accordance with the invention, Figure 2 is a transverse, vertical, sectional view of the valve which is located at the lower end of the device, showing the valve in its closed position, Figure 3 is a view, similar to Figure 2, with the release means for equalizing the pressures across the valve engaging said valve, Figure 4 is a horizontal, cross-sectional view, taken on the line 4—4 of Figure 1, and Figure 5 is a transverse, vertical sectional view of a modified form of valve cage.

In the drawing, the numeral 10 designates an elongate mandrel having an axial bore 11 extending therethrough. The upper portion of the outer surface of the mandrel is substantially cylindrical and a slip supporting sleeve 13 is slidable longitudinally on this portion. The sleeve is formed with an outwardly directed, annular flange 14 at its upper end and an external collar 15 is preferably made integral with its lower end. The collar has a plurality of radial slots 16 therein, which slots are spaced equidistant therearound and the upper ends of gripping elements 17 are inserted within the slots. A retaining ring 18 which surrounds the collar prevents outward displacement of the elements from said slots. Manifestly, the gripping elements are suspended from the sleeve 13 and are movable with relation to the mandrel. For limiting the movement of the sleeve on the mandrel the latter is formed with an external flange 19, preferably integral therewith. As clearly shown in Figure 1, this flange is slotted to permit the gripping elements 17 to extend therethrough. A confining ring 20 surrounds the flange and confines the elements within the slots of said flange, whereby the gripping elements are retained in close proximity to the outer surface of the mandrel.

Immediately below the flange 19, the surface of the mandrel is flared or inclined outwardly to form a slip expanding portion 21. Each gripping element 17 includes an arcuate slip 22 at its lower end and the inner surfaces of the slips engage and ride upon the inclined surface 21 of the mandrel. The outer surface of each slip is formed with gripping teeth 23 which are adapted to engage the inner wall of the well tubing A to prevent upward displacement or movement of the slips and mandrel. When the slips 22 are at the upper end of the inclined portion 21 and immediately below the flange 19 they are retracted and out of engagement with the tubing wall; however, movement of the slips downwardly with relation to the mandrel 10 causes the outward radial movement thereof to the position shown in Figure 1, whereby said slips engage the tubing wall to hold the mandrel in position.

Below the slip-expanding or inclined surface 21 the mandrel is formed with a reduced shank 24, whereby an external annular shoulder 25 is provided. A plurality of elastic packing cups 26 surround the shank, being spaced from each other by suitable spacing collars or rings 27. The uppermost cup abuts the shoulder 25 and the cups and spacers are retained on the shank by a tubular valve cage or housing 28 which is threaded onto the lower end of the shank. Normally, there is a clearance between the cups and wall of the tubing but when the device is set within said tubing, as will be explained, the well fluid pressure below the device acts upwardly against the packing cups to deform the same into sealing engagement with the wall of the well tubing, whereby the annular space between the well tubing and the mandrel is sealed off.

The bore 29 of the valve cage 28 is reduced at its lower portion as shown at 30, whereby an internal annular shoulder 31 is formed within the cage. An inwardly directed flange 32 is preferably made integral with the cage and is located at the extreme lower end of the same, the axial opening or hole formed by the flange establishing communication between the area outside the body and the lower end of the bore of said body. Above the shoulder 31 a plurality of elongate vertical slots or openings 33 extend through the wall of the cage and establish communication between the well tubing A and the bore of the valve cage. The slots are preferably of a sufficient cross-sectional area to permit an unrestricted flow through the mandrel; however, if desired, they may be reduced in area to restrict the flow to a predetermined rate. The size and shape of said slots is subject to variation.

A valve 34 is slidable within the bore of the cage and includes a valve head 35 which is movable within the upper portion 29 of the bore. The head is substantially frusto-conical and is adapted to engage an annular seat 36 which is formed at the lower end of the bore 11 of the mandrel. A reduced shank 37 depends from the head, being preferably integral therewith, and said shank is slidable in the reduced portion 30 of the bore of the valve cage. When the valve is in a lowered position (Figure 1) the head 35 rests on the internal shoulder 31 within the valve cage and a flow of well fluid from the tubing A through the slots 33 and into the mandrel bore 11 is permitted; however, when the valve moves to its upper position (Figure 2) the head 35 engages the seat 36 to shut off the flow from the tubing through the mandrel.

The valve 34 is provided with an axial bore 38 which extends entirely through the shank 37 and head 35 and the bore is reduced at its extreme upper end to form an internal annular shoulder or seat 39 within the head. Since the valve cage 28 has its bore open at its lower end, it will be obvious that the well fluid may flow upwardly through the valve cage and into the axial bore 38 of the valve.

For closing the bore of the valve 34, a ball or other valve 40 is arranged to engage the seat 39 within the valve head. The ball rests on a recessed disk 41 which is engaged by the upper end of a coiled spring 42 located within the bore 38 of the valve. The lower end of the spring rests upon an annular cap nut 43 which is threaded into the lower end of the bore 38 and, manifestly, with this arrangement, the spring exerts its pressure to hold the valve 40 seated, whereby the bore 38 of the valve is closed. It is noted that the nut 43 is annular so that the bore 38 is open to the well fluid pressure within the tubing below the device.

In lowering the device into the well tubing, a suitable lowering device (not shown) is connected to the upper end of the mandrel 10 by means of shear pins (not shown), or other releasable means, which extend through openings 44 provided for this purpose. The device is thus suspended from the lowering device which is attached to a cable or wire line, and the lowering is continued until the depth at which it is desired to set the device is reached. During the lowering operation the slips 22 merely ride on the surface of the tubing wall but do not take hold as the mandrel is constantly moving ahead of said slips. Before lowering the device, the well control devices which consist of the usual control valves, chokes and the like (not shown), at the surface of the well tubing have been closed to shut off any flow through the tubing and, therefore, the device moves downwardly through the fluid which might be standing in the well. The packing cups 26 are in a normal undistorted position whereby there is a clearance between said cups and tubing wall to permit by-passing of the well fluid within the tubing around the device as it is lowered therethrough.

In order to set the device within the tubing A, a sudden upward pull is exerted on the mandrel 10 by means of the lowering device (not shown). Such upward movement of the mandrel causes the free riding slips 22 to be moved outwardly by the inclined surface 21, whereby said slip teeth engage the tubing wall. Repeated upward jarring tends to more firmly set the slips and such upward jarring also shears the pins (not shown) which extend through the openings 44 in the mandrel, after which the lowering device is removed from the tubing. It is pointed out that the device could be set in other ways, as for example, by connecting the lowering means to the slip collar 13 and jarring downwardly.

After the slips 22 have been engaged with the tubing wall, the surface controls which control the production of the well, (not shown) are opened to permit the well fluid to flow upwardly through the tubing at the desired, predetermined rate. As soon as this flow starts, the packing cups 26 are deformed by the well fluid pressure into sealing engagement with the well tubing. This fluid pressure may also act against the mandrel 10 to further tighten the gripping engagement of the slips 22 with the tubing A. Further, the well fluid pressure may move the valve 34 to its raised or seated position, although in many instances, the valve may remain in a lowered or open position.

In the event that the valve 34 has been seated, then to unseat said valve to permit the flow of well fluid from the tubing A through the slots 33 in the valve cage 28 and upwardly through the mandrel and tubing thereabove, a tool having a rod or prong 45 is lowered through the tubing and bore of the mandrel (Figure 3). This rod has its lower end reduced at 46, whereby an external shoulder 47 is formed on said rod. The diameter of the rod is slightly smaller than the bore of the mandrel to permit flow past said rod while the reduced portion 46 is of such size as to permit its entering the upper end of the bore 38 of the valve head to engage the ball 40.

When the device is set within the tubing and the valve 34 is closed, as has been explained, the well fluid is trapped below the same, whereby its pressure is exerted against the valve 34 to hold the same in a raised position. This pressure is often sufficient to prevent the valve 34 being moved downwardly by merely engaging said valve with a rod or other device lowered from the surface, and in order to unseat the valve it is first necessary that the pressures above and below the valve be equalized to some extent. It is to permit this equalization of pressures that the ball 40 is provided within the valve 34. Due to the fact that the effective cross-sectional area of the ball exposed to the well fluid is much less than the effective cross-sectional area of the valve 34, the ball may be more readily unseated by the jarring action of the prong.

After the rod 45 is lowered through the mandrel so that its reduced end 46 engages the ball, repeated jarring or hammering is imparted to the ball through the rod, whereby said ball is momentarily unseated from the shoulder 39 upon each jar. This unseating of the ball 40 allows well fluid to escape upwardly through the bore of the mandrel and into the tubing thereabove. Therefore, a pressure will begin to build up above the valve 34 and this pressure will act against the pressure below the valve, whereby a condition soon occurs which permits the ball valve 40 to be held entirely open, permitting the rod 45 to be lowered so that its shoulder 47 engages the valve head 35 and moves the same downwardly. It is noted that other ways of equalizing the pressures across the valve 34, such as by-passing the well fluid from the casing to the bore of the tubing above the valve, may be employed, in which case the ball 40 may be eliminated.

As soon as the valve 34 is moved to the position shown in Figure 1, the rod 45 is removed. The well controls at the surface are then opened to permit a normal or predetermined flow of well fluid upwardly through the mandrel and tubing. It is pointed out that the well controls at the surface, herein referred to, are standard equipment on flowing wells. These controls include the usual control valves and surface chokes, the latter, as is well known, being provided for the purpose of restricting or maintaining the flow of well fluids upwardly through the production string at a desired or predetermined rate. In some instances, the choke which is connected in the production string takes the form of an adjustable metering valve while in others, said choke may be a nipple having a fixed orifice, commonly referred to as a flow bean. So far as the efficient operation of this invention is concerned the particular construction of the choke or other flow restricting or control device, which is mounted in the production string, is unimportant and so long as the well fluids normally flow from the production string, which is illustrated herein is the well tubing, at a predetermined rate under normal conditions, the invention shown herein will operate efficiently. As explained, the usual surface controls remain closed to shut in the well while the well device is run in and set and until the valve 34 is moved to an open position. The controls are then opened and the usual surface choke (not shown) permits upward flow through the tubing. This flow is such that the force created by the fluid above the valve together with the weight of the valve, is sufficient to balance the upward force created by the well fluid below the valve and therefore, as long as the flow is at a normal or predetermined rate, the valve remains open or unseated and does not in any way interfere with the flow upwardly through the mandrel.

It has been found that the well control connections and devices at the surface of the well sometimes fail or are broken. This often occurs where wells are drilled in bodies of water in which event the casing and tubing must extend upwardly through the water and above the surface thereof. The casing and tubing, in these instances, may be broken off under water by passing ships, storms, driftwood, or from other causes and such breakage separates the well control connections at the surface from the tubing in the hole, whereby the flowing well is uncontrolled, because the usual surface choke or restricting means is, under such conditions, disconnected from the production string and unrestricted flow of well fluids from the string follows. Not only on underwater wells, but also on other wells, the surface control connections are subject to breakage or failures.

The valve 34 remains in an open or inactive position as long as the well flows normally or at a predetermined rate since the force exerted against the lower end of the valve 34 by the normally flowing well fluid is insufficient to raise said valve. However, in the event that the surface connections fail or are broken, and the restriction of the usual surface choke or control is removed, then obviously, the flow through the tubing above the mandrel 10 is increased, resulting in an increased flow velocity through the tubing and mandrel. The increased velocity immediately sets up or creates an increased force or impact against the lower end of the valve, which force or impact is caused by the sudden rush of fluid upwardly against the valve. This increased force or impact below the valve immediately raises said valve into engagement with the seat 36 at the lower end of the mandrel, whereby the flow is cut off. Thus, it will be seen that, in the event the surface controls fail or are broken, the valve immediately and automatically shuts off the flow to bring the well under control. The surface controls may be repaired or replaced, after which the valve 34 is again lowered or opened by the rod 45, or other means.

The removal of the entire device may be accomplished at any time by merely lowering a removing device (not shown) and engaging the same beneath the shoulder 14 on the slip-carrying sleeve 13. A downward jar is then imparted to the mandrel causing the mandrel to move downwardly with relation to the slips 22 which permits the slips to move inwardly to a retracted position to disengage the same from the tubing. The slips engage beneath the flange 19 on the mandrel as the sleeve is pulled upwardly from the well, whereby said mandrel is carried upwardly therewith. The device may be set at a different depth within the tubing, or it may be entirely removed therefrom. The setting and removal may be accomplished by means of a cable or wire line. It is pointed out that the action of the valve 34 is automatic in closing off the flow, being controlled by the change in well conditions which may be due to various causes.

In Figure 5, a slightly modified form of the invention is shown wherein openings or slots 33' in the valve cage 28 are made of less area than the slots 33 shown in Figure 1. The combined area of the slots 33' is less than the cross-sectional area of the bore of the mandrel, whereby said slots restrict the flow from the tubing to the mandrel. The area of the slots 33' is sufficient to permit a predetermined rate of flow therethrough and as long as such flow continues, the valve 34 remains in its open position. With the valve open and the fluid flowing at such predetermined rate, a pressure differential across the valve is set up, but this differential is not sufficient to close the valve, the weight of said valve holding the same in its open position. In the event that the velocity of the fluid flowing up the tubing above the valve 34 is increased beyond a predetermined rate, due to the breakage of fittings or leaking or variation in the composition of the flowing streams, or from any other cause, the restricted slots 33', will cause a pressure differential sufficient to elevate and close the valve 34 against its seat 36.

What I claim and desire to secure by Letters Patent is:

1. A well flowing control device including, an elongate unitary support having a flow passage through which the natural well fluid is conducted and open while the well is producing under normal flowing conditions, said passage having a natural well fluid inlet, and closure means free to move and carried by the support co-acting with the inlet and passage of the support and open while the natural well fluid is flowing through the inlet and passage under normal flowing conditions, said means having one side exposed to the natural well fluid flowing into the inlet and its other side shut off to such flow and exposed to the natural well fluids flowing from source, whereby the said closure means is held open during normal flowing conditions and is moved to a closed position to shut off flow upward through the passage of the support when the velocity of flow of the well fluid is abnormally increased.

2. A well flowing control device including, an elongate support having a flow passage therethrough for conducting the well fluids while the well is producing and open under normal flowing conditions, said passage having an inlet for the well fluid, means for anchoring said support in a well casing, and closure means free to move and carried by the support and located so that the well fluid entering through the inlet flows over the upper side of said means and the well fluid from the well exerts its pressure against the underside of said means, said closure means remaining open under normal flowing conditions and free to be closed by the well fluid upon abnormal increase in the velocity of the flowing well fluid.

3. A well flowing control device including, an elongate support having a flow passage therethrough and a valve seat in said passage, said support having an inlet for the fluid from the well to said passage below and adjacent said valve seat, and a valve carried by the support below the valve seat and free to move, said valve being normally open with its upper side exposed to the well fluid entering the inlet of the passage, the underside of the valve when open being shut off from the well fluid flowing through the inlet and into the passage and exposed to well fluid flowing from source, said valve being free to be moved to close against the seat when the velocity of flow of the well fluid increases beyond a predetermined rate.

4. A well flowing control device removably mounted within a well tubing and including, a tubular support, means carried by the support for sealing off between said support and tubing, said support having an opening therein disposed below the sealing means whereby the flow of well fluid from below said sealing means passes through said opening and upwardly through said support, a valve normally open while the well is producing and carried by the support below said opening and having its lower end exposed to the well fluid flowing from source, its upper end being exposed to the natural well fluid flowing through the support, said valve being disposed and constructed to resist movement by a flowing natural well fluid under normal flowing velocity, but to be moved upwardly and closed by a flow of natural well fluid of excessive velocity.

5. A well flowing control device removably mounted within a well tubing including, a tubular support, means for sealing off between said support and tubing, and a valve normally open while the well is producing and carried by the support below the sealing means for controlling the flow of the natural well fluid through said support, said support having an opening above the valve and below the sealing means whereby the said well fluid may flow upwardly through the support and also having an opening below the valve, whereby the valve has its opposite sides exposed to the natural well fluid flowing through the support and the well fluid below said valve, said valve being constructed and arranged to remain open under predetermined normal well flowing conditions and automatically closing when the velocity of said flow through the support exceeds a predetermined rate to change such flow conditions, and means for reopening said valve with the device mounted within the well tubing.

6. A well flowing control device removably mounted within a well tubing and including, a tubular mandrel, means carried by the mandrel for sealing off between said mandrel and tubing, said mandrel having an opening therein disposed below the sealing means whereby the flow of well fluid from below the sealing means passes through said opening and upwardly through the mandrel, a valve seat within the mandrel above said opening, a valve normally open while the well is producing and within the mandrel adapted to engage said seat to cut off the flow of the natural well fluid through the mandrel, said valve being located below the opening so that its upper side is exposed to the natural well fluid flowing through the mandrel, the lower side of the valve being exposed to the well fluid below said valve, said valve being disposed and constructed to resist movement by a flowing natural well fluid under normal flowing velocity, but to be moved upwardly and closed by a flow of natural well fluid of excessive velocity.

7. A well flowing control device removably mounted within a well tubing and including, a tubular mandrel, means carried by the mandrel for sealing off between said mandrel and tubing, said mandrel having an opening therein disposed below the sealing means whereby the flow of well fluid from below said sealing means passes through said opening and upwardly through the mandrel, a valve seat within the mandrel above said opening, a valve normally open while the well is producing and within the mandrel adapted to engage said seat to cut off the flow of the natural well fluid through the mandrel, said valve being located below the opening so that its upper side is exposed to the said fluid flowing through the mandrel, the lower side of the valve being exposed to the natural well fluid below said valve, said valve being constructed and arranged to remain open under predetermined natural well flowing conditions and automatically closing when the velocity of flow of natural well fluid through the mandrel exceeds a predetermined point to change such natural well flowing conditions, the sudden increase in flow velocity causing an impact against the lower side of the valve which immediately moves said valve to its closed position, and means for reopening said valve with the device mounted within the well tubing.

8. A well flowing control device including, a mandrel having a flow passage therethrough, means for sealing off between the device and a well casing, means for anchoring the device in a well casing, the passage of the mandrel having a valve seat, the mandrel having an inlet below the valve seat, a valve support having an inlet for the well fluid below the inlet to the passage, a valve resting on said support below said valve seat when open and free to move to close the discharge end of the inlet to said support, the upper side of said valve being exposed to the well fluid flowing through the inlet to the passage, whereby said valve remains open during a normal flow of the well fluid, said valve being free to close upon an increased flow velocity, and means freely movable down through the well tubing for unseating said valve.

9. A well flowing control device including, a mandrel having a flow passage therethrough, means for sealing off between the device and a well casing, the passage of the mandrel having a valve seat, the mandrel having an inlet below the valve seat, a valve support having an inlet for the well fluid below the inlet to the passage, a valve resting on said support below said valve seat when open and free to move to close the discharge end of the inlet to said support, the upper side of said valve being exposed to the well fluid flowing through the inlet to the passage, whereby said valve remains open during a normal flow of the well fluid, said valve being free to close upon an increased flow velocity, a spring pressed valve mounted in the first named valve, and means freely movable down through the well tubing to engage both valves for unseating the same.

10. A well flowing control device arranged to be located within the bore of a flowing well including, a support having means for sealing it in a well tubing and a flow passage therethrough, means normally open while the well is producing and connected with the support and actuated by the flowing natural well fluids for shutting off the flow through said passage when a predetermined abnormal flow of the natural well fluid occurs in said passage, and a valve within said shut-off means adapted to be operated from the surface of the well to effect the opening of said shut-off means so that the natural well flow may be resumed.

11. A well flowing control device arranged to be located within the bore of a flowing well including, a support having means for sealing it in a well tubing and a flow passage therethrough, means normally open while the well is producing and connected with the support and actuated by the flowing natural well fluids for shutting off the flow through said passage when a predetermined abnormal flow of the natural well fluid occurs in said passage, and means for causing said shut-off means to open to resume said flow.

12. A well device arranged to be located within the bore of a well including, a support having a flow passage therethrough, a valve cage at the lower end of said support, a valve member within said cage normally in a position to maintain the flow passage open while the well is producing for controlling the flow of natural well fluid therethrough, said valve cage having an opening therethrough for directing fluid past the valve member as it flows through said flow passage with the valve remaining open to permit said flow through the support under normal well flowing conditions, and said valve cage having an opening communicating with the under side of said valve member whereby the valve will be moved to its closed position to cut off said flow of the natural well fluid when the velocity of flow through the support exceeds a predetermined velocity to change such flow conditions.

13. A well device arranged to be located within the bore of a well including, a support having a flow passage therethrough, a valve cage at the lower end of said support, a valve member within said cage normally in a position to maintain the flow passage open while the well is producing for controlling the flow of natural well fluid therethrough, said valve cage having an opening therethrough for directing the fluid past the valve member as it flows through said flow passage with the valve remaining open to permit said flow through the support under normal well flowing conditions, and said valve cage having an opening communicating with the under side of said valve member whereby the valve will be moved to its closed position to cut off said flow of the natural well fluid when the velocity of flow through the support exceeds a predetermined velocity to change such flow conditions, wherein the velocity differentials in pressure acting on the valve is controlled by the ratio of said fluid openings in the valve cage with respect to each other.

14. A well device arranged to be located within the bore of a well including, a support having a flow passage therethrough, a valve cage at the lower end of said support, a valve member within said cage normally in a position to maintain the flow passage open while the well is producing for controlling the flow of natural well fluid therethrough, said valve cage having an opening therethrough for directing the fluid past the valve member as it flows through said flow passage with the valve remaining open to permit said flow through the support under normal well flowing conditions, and said valve cage having an opening communicating with the under side of said valve member whereby the valve will be moved to its closed position to cut off said flow of the natural well fluid when the velocity of flow through the support exceeds a predetermined velocity to change such flow conditions, wherein the velocity differentials in pressure acting on the valve for closing the flow passage is determined by varying the restrictions of the cage opening to the flow of well fluid through the device.

15. A well device arranged to be located within the bore of a well including, a support having a flow passage therethrough, a valve cage at the lower end of said support, a valve member within said cage normally in a position to maintain the flow passage open while the well is producing for controlling the flow of natural well fluid therethrough, said valve cage having an opening therethrough for directing the fluid past the valve member as it flows through said flow passage with the valve remaining open to permit said flow through the support under normal well flowing conditions, and said valve cage having an opening communicating with the under side of said valve member whereby the valve will be moved to its closed position to cut off said flow of the natural well fluid when the velocity of flow through the support exceeds a predetermined velocity to change such flow conditions, said valve member having a fluid passage therethrough with a restricted opening in line with the flow passage through the support, and a valve within said valve member yieldingly held in position to close said restricted opening in the valve member and accessible through the flow passageway in the support to be opened by an operating rod when the valve member closes the flow passage so as to re-establish the passageway through the device and effect a movement of the valve member to open position.

16. A well device arranged to be located within the bore of a well including, a support having a flow passage therethrough with a large orifice, means controlled by the flow of fluid therethrough for closing the passage when the velocity of flow through the support exceeds a predetermined velocity as in the case of a blowout, and means thereafter for controlling the fluid flow through a smaller orifice.

17. A flow controlling device having means for removably anchoring it in a well flow tubing and including, a support having means for sealing it in a well tubing and provided with a flow passage therethrough, said support having a valve seat contiguous to its flow passage and provided with a passage below said seat for admitting natural well fluid from source, and a valve carried by the support below said seat and movable up to said seat to shut off flow through the flow passage of the support, said valve being disposed in and co-acting with said support so as to resist upward displacement by the well fluid flowing from source when said fluid is being discharged from the well under a predetermined normal flowing velocity and to be moved upwardly to engage said seat and cut off flow of the well fluid through the tubing when the flow from the tubing exceeds the said normal flowing velocity.

18. A well flow control device as set forth in claim 17 wherein the valve has a flow passage normally closed, and means controllable from the top of the well for opening said valve passage.

19. In combination with a flowing well, a casing within said well and a tubing within said casing, a packer surrounding said tubing and adapted to form a sealing engagement with said casing, means providing a passageway through said packing, and a normally open valve in the path of flow through said passageway adapted to be closed when the flow through said passageway exceeds a predetermined rate.

20. In combination with a flowing well, a passageway leading from the bottom thereof, and means for preventing more than a predetermined substantial rate of flow upwardly through said passageway, comprising an upwardly closing valve in said passageway, which valve remains open during substantial upflow not exceeding said predetermined rate of flow and is closed by a velocity of flow exceeding said predetermined rate.

21. A well flowing control device arranged to be disposed within the bore of a flowing well having a surface flow control and including, a supporting member having a flow passage through which the well fluids are conducted, and valve means carried by the supporting member and co-acting with said passage to control flow through the passage and normally open while the well is producing, said means being disposed to be actuated by the flowing well fluids to shut off flow through the passage when a predetermined abnormal upward flow of the well fluid occurs in said passage.

22. A well flow shut-off device having means for connecting it in the flow line of a well having a surface fluid flow control connected in its flow line and including, a passageway adapted to be connected to the flow line of the well, and valve means for preventing more than a predetermined substantial rate of flow upwardly through said passageway including an upwardly closing valve co-acting with said passageway, which valve remains open during substantial upward flow of the fluid not exceeding said predetermined rate of flow and is closed by a velocity of flow exceeding said predetermined rate.

23. In a well flow shut-off device adapted to be mounted in the flow line of a well, means for preventing more than a predetermined rate of flow of fluid upwardly through the well flow line having a valve seat and including an upwardly closing valve for engaging said seat, which valve is sufficiently heavy to remain open during substantial upward flow of the fluid not exceeding said predetermined rate of flow and is disposed so as to be closed against said seat by a velocity of flow exceeding said predetermined rate.

24. A well flow shut-off device having means for connecting it in the flow line of a well and including, a body having a flow passage for connection with the flow line of the well, a valve seat, a movable valve member closing against said seat and sufficiently heavy to remain open during substantial upward flow of fluid through said passage beyond said seat not exceeding a predetermined rate, and means in advance of said seat proportioned to permit flow of fluid through said passage while said predetermined flow rate is maintained and when said rate of flow beyond said seat increases and creates a predetermined pressure variation across said valve member the pressure of the fluid in advance of said means moves said valve member to close against said seat.

HERBERT C. OTIS.